Figure 1:
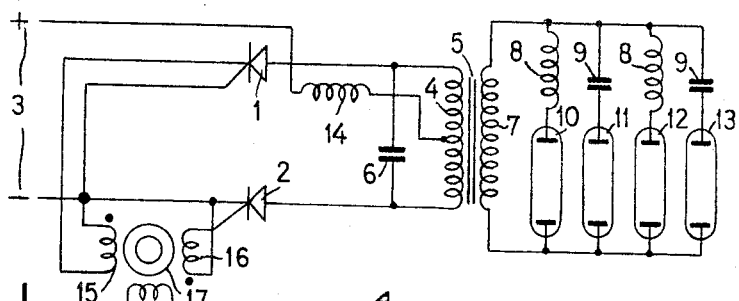

Sept. 13, 1966 J. J. WILTING 3,273,076
SELF-GENERATING INVERTER WITH CONTROLLED
SEMI-CONDUCTOR RECTIFIERS
Filed Jan. 22, 1962

INVENTOR
JOHANNES J. WILTING
BY
Frank R. Trifari
AGENT

United States Patent Office 3,273,076
Patented Sept. 13, 1966

3,273,076
SELF-GENERATING INVERTER WITH CONTROLLED SEMI-CONDUCTOR RECTIFIERS
Johannes Jacobus Wilting, Emmasingel, Eindhoven, Netherlands, assignor to North American Philips Company, Inc., New York, N.Y., a corporation of Delaware
Filed Jan. 22, 1962, Ser. No. 167,493
Claims priority, application Netherlands, Jan. 23, 1961, 260,387
9 Claims. (Cl. 331—113)

This invention relates generally to inverter circuits and more particularly to self-generating inverters including at least one controlled semi-conductor rectifier, also called a thyristor; the main current circuit electrodes of each thyristor are connected to the respective terminals of the direct current supply circuit and an oscillatory circuit is provided which is coupled to a load circuit and to the main current circuit of the thyristor.

Prior inverter circuits have used gas-filled triodes or thyratrons instead of controlled semi-conductor rectifiers. The thyratron acts as a switch which must be periodically ignited and extinguished preferably during a specific portion of the oscillating cycle.

An object of the present invention is to provide particularly effective and efficient means for periodically igniting the thyristors used in an inverter circuit arrangement.

The invention is based in part on the phenomenon of a reverse current pulse being produced in the circuit of the control electrode of a controlled semiconductor rectifier when the rectifier is extinguished. This pulse is produced by the flowing away of the free charge carriers stored in the layer connected to the control electrode; these carriers are caused to flow away by the reversal of the current direction through the main current circuit of the rectifier. This reversal in turn is the result of the oscillatory nature of this current which, in the case of a conducting rectifier, flows through a subcritically damped circuit.

The self-generating inverter according to the invention is characterized in that the rectifier is periodically rendered conductive under control of a reverse current pulse produced in the circuit of the control electrode of the extinguishing rectifier by compelled discharge of its p-n layers, and which produces a forward current pulse in the circuit of the control electrode of the rectifier to be rendered conducting.

The circuit arrangement according to the invention preferably includes at least one pair of rectifiers connected in push-pull and an oscillatory circuit connected between corresponding main circuit electrodes of the rectifiers of one pair and provided with a center tap connected to the corresponding terminal of the direct current circuit. According to the invention, each rectifier is periodically rendered conducting under control of the reverse current pulse produced in the circuit of the control electrode of the other rectifier of the same pair, when this other rectifier extinguishes.

However, a circuit arrangement according to the invention may also comprise any number of rectifiers and even only one rectifier, provided the arrangement is such that the reverse pulse produced when a rectifier extinguishes produces the forward pulse to be applied to the control electrode of a following rectifier to be rendered conducting with the desired delay; in the case of a circuit having only one rectifier the delay is preferably equal to or larger than one half of a cycle of the alternating voltage produced across the oscillatory circuit.

Figure 2:
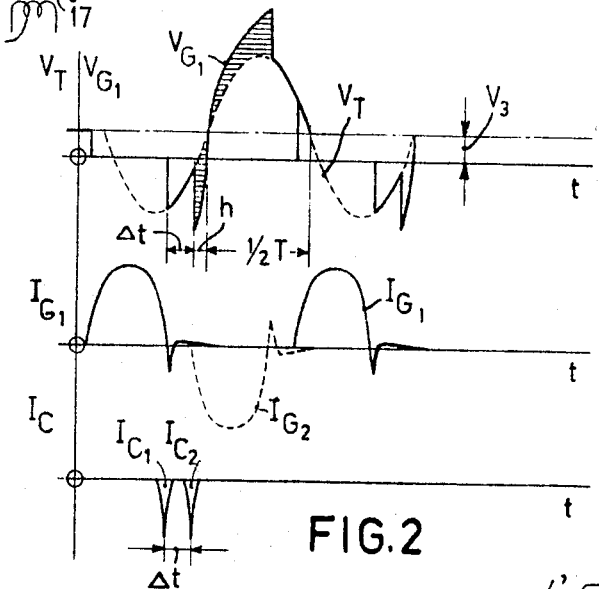
Figure 3:
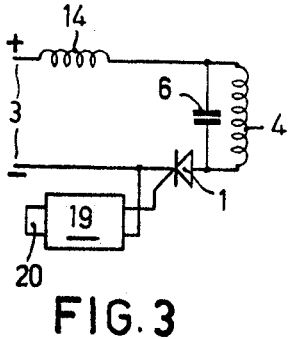
Figure 4:
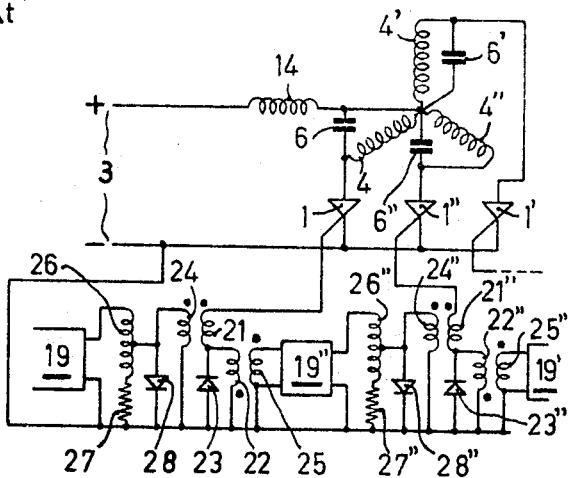

In order that the invention may readily be carried into effect three embodiments thereof will now be described more fully, by way of example, with reference to the accompanying drawings, in which:

FIGURE 1 shows the circuit diagram of one embodiment of the inverter according to the invention;
FIGURE 2 shows current and voltage time diagrams to illustrate the operation of this embodiment, and
FIGURES 3 and 4 are circuit diagrams illustrative of two further embodiments of the inverter according to the invention.

The embodiment shown in FIGURE 1 is a self-generating inverter having one pair of controlled semi-conductor rectifiers 1 and 2. The main circuit electrodes of these rectifiers are connected to the respective terminals of a direct current supply circuit 3. An oscillatory circuit comprising the primary winding 4 of an output transformer 5 and a capacitor 6 connected in parallel with this winding is coupled to a load circuit comprising the secondary 7 of the transformer 5 and series combinations each of the latter may comprise a regulating impedance 8 or 9 and a fluorescent light tube 10 to 13 connected in series therewith. The primary 4 of the transformer 5 is provided with a center tap which, through an inductance 14, is connected to the positive terminal of the supply circuit 3. The oscillatory circuit 4–6 is consequently also coupled to the main current circuit of the rectifiers 1 and 2.

The controlled semi-conductor rectifiers 1 and 2, also called thyristors, are provided with control electrodes and each control electrode is connected to the negative terminal of the supply circuit 3 by means of a winding 15 and 16 respectively, provided on an annular ferrite core 17. The connections of the control electrodes to the windings 15 and 16 respectively are arranged so that a reverse current flowing between the control electrode of one of the thyristors and the negative terminal of the supply circuit 3, for example via the winding 15, produces a formed current flowing to the control electrode of the other thyristor via the other winding (for example 16). These relative polarities are indicated by the black dots near the associated windings. The core 17 has coupled to it a further winding 18 to which a starting pulse may be supplied. This winding may simultaneously serve also to polarize the core magnetically.

When a direct voltage is applied between the terminals of the supply circuit 3, the two rectifiers 1 and 2 remain cut off for a certain time. To this end, the applied voltage should naturally be chosen smaller than the breakdown voltage of the rectifiers. If a current pulse is passed through the winding 18 of the core 17, it produces a forward current pulse through the circuit of the control electrode of one of the rectifiers 1 and 2, and a reverse current pulse through the circuit of the control electrode of the other rectifier. Therefore, the first mentioned rectifier is ignited or rendered conducting, while the other rectifier remains cut off. The current flowing through the ignited rectifier, for example, the rectifier 1, the upper half of the winding 4 and the inductance 14 impulses the oscillatory circuit 4–6, so that a circulation current is produced in this circuit and also a sinusoidal sub-critically damped oscillation. A series circuit is now closed via the conducting rectifier and the direct current supply circuit 3, which series-circuit includes the inductance 14 and the impedance of the circuit 4–6 effective between the center tap of the winding 4 and the collector electrode of the conducting rectifier. The oscillation produced in this circuit has a frequency determined by the circuit elements, taking into account the load circuit coupled to it. The series circuit with the inductance 14 is chosen so that its series resonance frequency is equal to a little higher than the frequency of the alternating voltage $V_T$ produced across the oscillatory circuit (see first line of FIGURE 2). As a result, the current through the conducting rectifier is pulsatory and has a pulse duration equal to or smaller than half a cycle of the generated alternating voltage. At the first passage through zero of this current $I_G$ (second line of FIGURE 2), the rectifier 1 is extinguished. The mode of operation so far described is entirely known and normal. Of course, an alternating current or ignition pulses of alternating polarity might be supplied to the winding 18, as a result of which the rectifiers 1 and 2 would be ignited in turn. It has been found, as stated above, that on extinguishing a thyristor, a considerable sharp and very short reverse current pulse $I_C$ (third line of FIGURE 2) flows through the circuit of its control electrode provided this circuit has a sufficiently low impedance, as can easily be realized in the present embodiment. With thyristors already obtainable on the market, this reverse pulse can reach a peak value of, for example, 2 amps and higher. According to the present invention, this reverse current pulse is used in order to render the other rectifier conducting in turn. In the embodiment shown, this is effected in a very simple manner in that the control electrode-emitter circuits of the two rectifiers 1 and 2 are coupled to each other in phase-opposition by means of the transformer comprising the windings 15, 16 and 18 and the core 17. This transformer may also serve as a non-linear element, as a result of which the energy content of the produced forward current pulses is kept substantially constant. For this purpose it is only necessary that the core 17 be brought into a determined saturation condition, for example by the starting pulse supplied to the winding 18, and that it be brought into the opposite saturation condition by the following reverse current pulse, flowing for example through the winding 15, etc. The forward pulse, for example through the winding 16, is consequently produced by the flipping over of the core 17 from one magnetic polarization condition into the opposite polarization condition. Flipping over occurs only after the reverse current (for example through the winding 15) exceeds a determined threshold value and this current increases only with a determined, finite steepness: the forward ignition pulse through the winding 16 is consequently produced only after expiration of a very small delay time $\Delta t$ (see third line of FIGURE 2).

Within certain limits, the delay time $\Delta t$ can be changed, for example by proportioning the windings 15 and 16 or the core 17.

The small delay time $\Delta t$ corresponds to an equal reduction of the length of the current pulses through the thyristor with respect to half a cycle of the generated alternating voltage. On the other hand, under determined conditions the known thyristors have a determined recovery time, for example of the order of $12/\mu$sec., during which they can be reignited by a forward voltage applied across their main current electrode circuit. Such reignitions should be avoided because they correspond to a short circuit of the oscillatory circuit 4–6 by the two thyristors and consequently effectively also to a short circuit of the direct current supply circuit 3. These untimely reignitions are avoided in known manner by means of a series resonant circuit comprising the inductance 14, by which the duration of each current pulse through a thyristor is determined. As shown in the first two lines of FIGURE 2, the current $I_G$ through the inductance 14 passes through the value zero after a time $\Delta t + h$ larger or equal to the recovery time of the thyristors before the voltage $V_T$ across the circuit 4–6. In the second line of FIGURE 2, the current pulses $I_{G1}$ and $I_{G2}$ through the two rectifiers are shown, while the third line shows the small delay time $\Delta t$ between the reverse current pulse $I_{C1}$ through the control electrode circuit of an extinguishing rectifier and the current pulse $I_{C2}$ through the control electrode circuit of the other thyristor produced thereby.

Between the extinction of a thyristor and the instant at which a forward voltage is again present across its main current circuit, a time $\Delta t + h$ elapses. During the time $\Delta t$, both thyristors of FIGURE 1 are non-conducting, the circuit 4–6 is no longer coupled to the supply source 3 and the oscillation thereof decays with its natural resonance frequency. This time $\Delta t$ is equal to the delay of the forward current pulse $I_{C2}$ supplied to the control electrode of the one thyristor with respect to the reverse current pulse $I_{C1}$ flowing through the control electrode circuit of the other thyristor, at the extinction thereof, and which produces the forward current pulse $I_{C2}$.

During the time $\Delta t$, the voltage across the inductance 14 is equal to zero, since the current $I_{G1} + I_{G2}$ through this inductance and the differential quotient thereof are also zero. By the ignition of the other thyristor, for example 2, a voltage $V_G - V_T$ of the size and shape of the shaded area in the first line of FIGURE 2 is produced across the inductance 14. In this figure, $\Delta t$ is shown somewhat exaggerated. This delay time may also be substantially equal to zero. The time $h$ should then be larger than the recovery time of the thyristors used, and the steepness of the increasing voltage $V_G$ operative across the extinguished thyristor should also be sufficiently small to cause no untimely reignition, for example as a result of capacitive currents in the thyristor.

In FIGURE 2, the ratio $V_G/V_3$ is shown somewhat exaggerated for a normal load. In practice and with the nominal load, a favorable value for this ratio lies between 2 and 2½, while it may reach very high values in the unloaded condition.

The small delay time $\Delta t$ can be increased. For that purpose, use can be made, for example, of a delay line, of a monostable trigger circuit with a time constant determining the delay time $\Delta t$ or of an electro-mechanical delay device, for example a device of the type described in U.S. Patent 1,852,795, which includes an electromechanical transductor, a mechanical-electric transductor and a mechanical delay line, for example a helical steel-spring arranged between these transductors. The second embodiment shown in FIGURE 3 and the third embodiment shown in FIGURE 4 make use of this possibility. The second embodiment comprises only one thyristor 1, the main current circuit of which is connected to the direct current supply circuit 3 via an oscillatory circuit 4–6 and an inductance 14. The control electrode circuit of the thyristor 1 is connected to a delay line 19, the other end of which is short circuited, as shown by reference numeral 20. The delay line 19 is proportioned so that it transmits the reverse current pulse produced in the control electrode circuit at the extinguishment of the thyristor 1 to the short circuit 20 after one-fourth of a cycle of the oscillations in the oscillatory circuit 4–6. This short circuit reflects this pulse with reversed polarity to the control electrode of the thyristor 1, so that a forward current pulse is supplied to this control electrode after half a cycle of the oscillations in the oscillatory circuit 4–6. The thyristor 1 is ignited again by this forward current pulse at an instant at which a forward current through the main circuit of the thyristor again corresponds to an increase of the energy in the oscillatory circuit 4–6 and thus maintains the oscillations in this oscillatory circuit.

The third embodiment shown in FIGURE 4 comprises three thyristors 1, 1' and 1", the main circuits of which are connected to the direct current supply circuit 3 through oscillatory circuits 4–6, 4'–6' and 4"–6" and through a common inductance 14. The inductances 4, 4' and 4" of the oscillatory circuits are formed by the primaries of a three-phase-transformer, the core and the secondaries of which are not shown. The control electrodes of the thyristors 1, 1' and 1" are each connected to a circuit including the primary 21 of a first coupling transformer and the secondary 22 of a second coupling transformer. These two windings are connected in series and the winding 22 is shunted by a rectifier 23 which passes the reverse current pulses through the corresponding control electrode circuit. The secondary 24 of the first coupling transformer is shunted by a rectifier 28 which is blocked with respect to the reverse current pulses. The secondary 24 is connected to the center tap of an autotransformer 26, to which is connected the series combination of a delay line 19 and an impedance 27, the latter being equal to the input impedance of the line 19, so that current pulses can be transmitted only from the winding 21 to the line 19 and not in the opposite direction. The foregoing described control system is repeated for each of the thyristors. More particularly, for energizing the thyristor 1″ there is provided a control system comprising a delay line 19″ coupled to the winding 25″ connected to delay line 19′, windings 22″, 21″, 24″ and 26″, rectifiers 23″, and 28″ and resistor 27″. Similarly for controlling thyristor 1′, there is provided a control circuit comprising delay line 19′ coupled to winding 25″. Interposed between the delay line 19′ and delay line 19 in the same manner as between delay line 19 and delay line 19″ there are provided windings 25′, 22′, 21′, 24′ and 26′, rectifiers 23′ and 28, and resistor 27′. All these latter elements are not shown in order to simplify the drawing. The line 19 delays the reverse current pulse with a time interval equal to one-third of a cycle of the oscillations produced in the oscillatory circuit 4–6, 4′–6′ or 4″–6″. This line is terminated by the primary 25′ of the second coupling transformer of the following thyristor, for example of the thyristor 1′, and the winding directions of the windings 22′ and 25′ of this transformer are chosen such that the reverse current pulse transmitted via the line 19 is supplied as a forward current pulse to the control electrode of the thyristor 1′.

The control electrode circuit of the thyristor 1′ is in turn coupled to that of the thyristor 1″, through a network comprising a first coupling transformer 21′–24′, a balancing autotransformer 26′ with impedance 27, a delay line 19′ and a second coupling transformer 22″–25″ with short circuiting diode 23″. Again and in the same manner, the control electrode circuit of the thyristor 1″ is coupled to that of the thyristor 1. The thyristors 1, 1′ and 1″ are consequently periodically rendered conducting, the time of each ignition being one-third of one cycle of the produced oscillations after the extinguishment of the preceding one.

A condition for a satisfactory operation of this embodiment and of the embodiment shown in FIGURE 3 is that the frequency of the oscillatory circuits 4–6, 4′–6′ and 4″–6″ or of the oscillatory circuit 4–6 be comparatively high, so that the delay lines 19, 19′ and 19″ or the delay line 19 can be realized without an excessive amount and/or size of elements. In addition, the delay produced by the delay line 19 or by each of the delay lines 19, 19′ and 19″ should be equal to one-third of one cycle of the alternating voltage produced in the oscillatory circuit 4–6 or in the oscillatory circuits 4–6, 4′–6′ and 4″–6″. This restricts the load which may be coupled to the circuits, since the damping thereof by a load also has a certain influence on the natural or resonance frequency of the oscillatory circuit or circuits.

The load circuits of the second and of the third embodiments are not shown; they may have, for example, the same form as the load circuit shown in FIGURE 1, in which the regulating impedances 8 and 9 are partially capacitive and partially inductive, so that the whole load is substantially ohmic and the currents through the tubes 10 to 13 are shifted in phase with respect to each other, so as to mitigate a possibly disturbing stroboscopic effect.

While certain preferred embodiments of the invention have been shown, other modifications thereof will readily occur to those skilled in the art without departing from the inventive concept, the scope of which is set forth in the appended claims.

What is claimed is:

1. A self-generating inverter comprising: a controlled semi-conductor rectifier having p-n layers, main current circuit electrodes and a control electrode, said rectifier producing in circuitry connected to said control electrode a current pulse as a consequence of the flow of free charge carriers in said rectifier upon the interruption of current flow through said main current circuit electrodes, said main circuit electrodes being direct current conductively connected to respective terminals of a direct current supply source, means for periodically interrupting current flow to said main current circuit electrodes comprising a series oscillatory circuit including a first portion having an inductive reactance and a second portion having a capacitive reactance, said series oscillatory circuit being connected between one of the main circuit electrodes of said rectifier and the corresponding terminal of said direct current supply source, a load coupled to said oscillatory circuit, and means for periodically rendering the controlled rectifier conductive, said means comprising a control circuit connected between a main circuit electrode and the control electrode of said controlled rectifier, polarity-reversing time delay means connected to said control circuit and means for applying said current pulse to said delay means.

2. A self-generating inverter comprising: a controlled semi-conductor rectifier having p-n layers, main current circuit electrodes and a control electrode, said rectifier producing in circuitry connected to said control electrode a current pulse as a consequence of the flow of free charge carriers in said rectifier upon the interruption of current flow through said main circuit electrodes, said main circuit electrode being direct current conductively connected to respective terminals of a direct current supply source, means for periodically interrupting current flow to said main current circuit electrodes comprising a series oscillatory circuit including a first portion having an inductive reactance and a second portion having a capacitive reactance, said series oscillatory circuit being connected between one of said main current electrodes and the corresponding terminal of said direct current supply source, a load coupled to said oscillatory circuit, and means for periodically rendering said controlled rectifier conductive, said means comprising a control circuit connected between one main circuit electrode and the control electrode of said controlled rectifier, polarity reversing time delay means connected to said control circuit and means for applying said current pulse to said delay means.

3. A self-generating inverter comprising: two controlled semi-conductor rectifiers arranged in push-pull connection, each rectifier having p-n layers, main current circuit electrodes and a control electrode, said rectifiers producing in circuitry connected to the respective control electrodes a current pulse as a consequence of the flow of free charge carriers in the respective rectifier upon interruption of current flow through the main current circuit electrodes thereof, the main circuit electrodes of each rectifier being direct current conductively connected to respective terminals of a direct current supply source, means for periodically interrupting current flow to said main current circuit electrodes comprising a series oscillatory circuit including a first portion having an inductive reactance and a second portion having a capacitive reactance, said series oscillatory circuit being connected between corresponding ones of the main current electrodes of the rectifiers and the corresponding terminal of said direct current supply source, a load coupled to said oscillatory circuit, and means for periodically rendering said controlled rectifiers conductive, said means comprising a control circuit connected between a main circuit electrode and the control electrode of each controlled rectifier, polarity reversing time delay means connected to said control circuits, and means for applying current pulses from each of said rectifiers to said delay means.

4. An inverter as set forth in claim 3, wherein said delay means comprises a transformer having at least two windings each forming a direct current conductive control circuit and a core formed of a ferromagnetic material having a substantially rectangular hysteresis loop which is brought into a saturated condition by a current pulse flowing through one of said windings.

5. An inverter as set forth in claim 4, wherein said transformer has a third winding adapted to supply a starting forward current pulse to the control circuit of one of said rectifiers.

6. A self-generating inverter comprising: two controlled semi-conductor rectifiers arranged in push-pull connection, each rectifier having p-n layers, main current circuit electrodes and a control electrode, said rectifiers producing in circuitry connected to the respective control electrodes a current pulse as a consequence of the flow of free charge carriers in the said rectifiers upon the interruption of current flow through said main circuit electrodes, the main circuit electrodes of each rectifier being direct current conductively connected to respective terminals of a direct current supply source, a first inductive impedance interconnecting corresponding main electrodes of said rectifiers and having a center tap, a capacitive impedance connected in shunt with said inductive impedance, means for periodically interrupting current flow to said main electrodes comprising a second inductive impedance interconnecting said supply source and said center tap and forming with said capacitive impedance a series oscillatory circuit, a load coupled to said first inductive impedance, and means for periodically rendering said controlled rectifiers conductive, said means comprising a control circuit connected between a main circuit electrode and the control electrode of each controlled rectifier, polarity reversing time delay means connected to said control circuits and means for applying current pulses from each of said rectifiers to said delay means.

7. A self-generating inverter comprising: three controlled semi-conductor rectifiers arranged in phase sequence connection, each rectifier having p-n layers, main current circuit electrodes and a control electrode, said rectifiers producing in circuitry connected to the respective control electrodes a current pulse as a consequence of the flow of free charge carriers in said rectifiers upon the interruption of current flow through the main circuit electrodes, the main circuit electrodes of each rectifier being direct current conductively connected to respective terminals of a direct current supply source, means for periodically interrupting current flow to said main current electrodes comprising a series oscillatory circuit including a first portion having an inductive reactance and a second portion having a capacitive reactance, said series oscillatory circuit being connected between corresponding ones of the main current electrodes of the rectifiers and the correponding terminal of said direct current supply source, a load coupled to said oscillatory circuit, and means for periodically rendering said controlled rectifiers conductive, said means comprising three control circuits each connected between a main circuit electrode and the control electrode of a respective controlled rectifier, polarity reversing time delay means connected to a respective control circuit and means for applying the current pulse produced by a given controlled rectifier to the delay means of a phase succeeding controlled rectifier.

8. An inverter as set forth in claim 7, said capacitive portion being connected between corresponding ones of the main current electrodes of said three rectifiers, said inductive portion comprising the primary windings of a three-phase transformer and an inductor, the common terminals of said primary windings being coupled to one terminal of said source through said inductor, the outer terminals of said primary windings being connected to said corresponding ones of the electrodes.

9. An inverter as set forth in claim 7, wherein said delay means comprises a transformer having at least two windings each forming a direct current conductive control circuit and a core formed of a ferromagnetic material having a substantially rectangular hysteresis loop which is brought into a saturated condition by a current pulse flowing through one of said windings.

References Cited by the Examiner
UNITED STATES PATENTS

| | | | |
|---|---|---|---|
| 3,034,015 | 5/1962 | Schultz | 331—113.1 |
| 3,045,148 | 7/1962 | McNulty et al. | 331—112 |
| 3,120,633 | 2/1964 | Genuit | 331—113.1 |

OTHER REFERENCES

Solid State Products, Inc., Bulletin, August 1959, "A Survey of Some Circuit Applications of the Silicon Controlled Switch and Silicon Controlled Rectifier," page 28.

IBM Technical Disclosure Bulletin, vol. 2, No. 5, February 1960, page 85, "Solid State Binary Trigger," Olson.

ROY LAKE, *Primary Examiner.*